United States Patent
Leckband et al.

(10) Patent No.: US 10,747,749 B2
(45) Date of Patent: *Aug. 18, 2020

(54) METHODS AND SYSTEMS FOR MANAGING DISTRIBUTED CONCURRENT DATA UPDATES OF BUSINESS OBJECTS

(71) Applicant: TraceLink, Inc., Woburn, MA (US)

(72) Inventors: Craig Leckband, Bedford, MA (US); Peter J Spellman, Quincy, MA (US); Sean A Wellington, Newton, MA (US)

(73) Assignee: TRACELINK, INC., North Reading, MA (US)

( * ) Notice: Subject to any disclaimer, the term of this patent is extended or adjusted under 35 U.S.C. 154(b) by 1072 days.

This patent is subject to a terminal disclaimer.

(21) Appl. No.: 15/206,819

(22) Filed: Jul. 11, 2016

(65) Prior Publication Data

US 2016/0321317 A1    Nov. 3, 2016

Related U.S. Application Data

(63) Continuation of application No. 13/853,530, filed on Mar. 29, 2013, now Pat. No. 9,411,844.

(51) Int. Cl.
*G06F 16/23* (2019.01)
*G06F 16/245* (2019.01)

(52) U.S. Cl.
CPC ......... *G06F 16/2365* (2019.01); *G06F 16/23* (2019.01); *G06F 16/2336* (2019.01); *G06F 16/245* (2019.01)

(58) Field of Classification Search
CPC ............ G06F 16/2308; G06F 16/2336; G06F 16/2343; G06F 16/80
See application file for complete search history.

(56) References Cited

U.S. PATENT DOCUMENTS

| | | | |
|---|---|---|---|
| 2004/0181561 A1* | 9/2004 | Knox | G06F 16/30 |
| 2012/0101980 A1* | 4/2012 | Taleghani | G06F 17/2288 707/608 |

* cited by examiner

*Primary Examiner* — William Spieler
(74) *Attorney, Agent, or Firm* — Steven M. Greenberg, Esq.; Shutts & Bowen LLP

(57) ABSTRACT

A computer-implemented method and system for distributed concurrent data updating of a business object having a structured format.

23 Claims, 5 Drawing Sheets

```xml
<?xml version="1.0" encoding="UTF-8" standalone="yes"?>
<qualityReview>
  <QualityReviewID>77cc366b-847d-4032-8795-ae5468475ed1</QualityReviewID>
  <LastChange>
    <Created>2013-03-25T16:04:25.3632Z</Created>
    <Author>99cf68fb-ee01-439b-b6bb-1180beb71174</Author>
    <Updated>2013-03-25T16:15:43.4082Z</Updated>
    <LastModifier>99cf68fb-ee01-439b-b6bb-1180beb71174</LastModifier>
    <Cookie>XITkhciEPtoVPQwxoLkkxNXGuDdyCbbYwUCPe5DjBs=</Cookie>
  </LastChange>
  <ProcessLinkID>5943c7c23-1608-44@e-9209-f25d576bdf27</ProcessLinkID>
  <QualityReviewType>BATCH_RECORD</QualityReviewType>
  <datePosted>2013-03-25</datePosted>
  <ReviewNumber>117043727-23CN431</ReviewNumber>
  <Title>Lot 23CN431 for 11704327 Run 03/25/13</Title>
  <Description>Batch review for 23CN431 manufactured on 09/25/13 line 1 for item 11704327&#xD;
&#xD;
Description updated from original.</Description>
  <ContactName>Cmem1CsvCustomer</ContactName>
  <CompanyName>CsvCustomer</CompanyName>
  <Status>GREEN</Status>
  <BatchRecord>
    <BatchRecordID>b1bd05a-24e1-4b91.94a3-085ff2e1a49e</BatchRecordID>
    <dueDate>2013-04-17</dueDate>
    <ItemInfo>
      <ProductInfoID>294b374a-0b59-4693-9c3f-15e94336d23</ProductInfoID>
      <ItemCode>11704327</ItemCode>
      <Description>FluMed 50MG capsule</Description>
      <IsDeleted>false</IsDeleted>
      <LotNumbers>
        <LotNumber>0b55d411-3496-42ac-a0b6-05e6979ec92b</LotNumberID>
        <LotNumber>23CN431</LotNumber>
        <IsDeleted>false</IsDeleted>
        <LastChange>
          <Created>2013-03-25T16:04:25.350Z</Created>
          <Author>99cf68fb-ee01-439b-b6bb-1180beb71174</Author>
          <Updated>2013-03-25T16:04:25.350Z</Updated>
          <LastModifier>99cf68fb-ee01-439b-b6bb-1180beb71174</LastModifier>
          <Cookie>Xskdya CaXl6mBye5Bncd5KlNbxN dXc89tqpgYc73Kik=</Cookie>
        </LastChange>
      </LotNumbers>
      <LastChange>
        <Created>2013-03-25T16:04:25.3482Z</Created>
        <Author>99cf68fb-ee01-439b-b6bb-1180beb71174</Author>
        <Updated>2013-03-25T16:04:25.3462Z</Updated>
        <LastModifier>99cf68fb-ee01-439b-b6bb-1180beb71174</LastModifier>
        <Cookie>anF8L7p0K9dB/wv/W+bRUja582imXenBW 269HnqgUW Q=</Cookie>
      </LastChange>
    </ItemInfo>
</qualityReview>
```

FIG. 4

METHODS AND SYSTEMS FOR MANAGING DISTRIBUTED CONCURRENT DATA UPDATES OF BUSINESS OBJECTS

CROSS REFERENCE TO RELATED APPLICATIONS

This application is a continuation of and claims priority from U.S. patent application Ser. No. 13/853,530 filed on Mar. 29, 2013, which claims priority from U.S. Provisional Patent Application No. 61/617,385 filed on Mar. 29, 2012, both entitled METHODS AND SYSTEMS FOR MANAGING DISTRIBUTED CONCURRENT DATA UPDATES OF BUSINESS OBJECTS, which is hereby incorporated by reference.

BACKGROUND

For the last 10-15 years, the best practices for managing concurrent access to resources for websites have been to back the web application with a database and have its built in concurrency control manage access in a controlled fashion. The so-called ACID (Atomicity, Consistency, Isolation, Durability) properties of databases lent themselves well to building well-behaved web applications.

Traditional relational database technology relies on maintaining a global state for maintaining ACID properties. This fact makes it difficult to build systems that are horizontally scalable.

More recently, ACID was deemed to be too restrictive for web applications, and a common architecture to manage concurrency uses the middle layer of a three tier architecture to manage application concurrency. This still relies on global state for tracking concurrency, but application designers chose how to compartmentalize the system to take advantage of natural data boundaries (called sharding) to limit the scope of concurrent access. Ad hoc concurrency control is remarkably difficult to code correctly. Most application developers do not take the time to prove that their concurrency scheme works or place safeguards to detect when concurrency assumptions are violated. The two most common failures are lost updates (effectively some form of last one out wins) or undetected application deadlocks.

BRIEF SUMMARY OF THE DISCLOSURE

In accordance with one or more embodiments, a computer-implemented method is provided for distributed concurrent data updating of a business object having a structured format. The method comprises the steps, performed by a client computer system, of: (a) retrieving a stored business object from an object repository accessible by a plurality of client computer systems, said business object divided into a plurality of subsections based on semantics of the business object, each of the plurality of subsections including a sentry having a given value based on content in the subsection; (b) modifying content in one or more subsections of the stored business object retrieved in (a) to form a modified business object; (c) retrieving the stored business object from the object repository and acquiring a lock on the stored business object in the object repository; (d) comparing the value of the sentry for a subsection of the modified business object to a value of the sentry in the corresponding subsection of the stored business object retrieved in (c); (e) when the values of the sentries compared in (d) are different, signaling a conflict; (f) when the values of the sentries compared in (d) are the same, determining whether the subsection has been changed in the modified business object; (g) when the subsection of the modified business object has been determined to have been changed in (f), computing a new value for the sentry for the subsection, and updating the modified business object to include the new value of the sentry for the subsection; (h) repeating (d) to (g) for each subsection of the modified business object; and (i) storing the modified business object in the repository.

In accordance with one or more further embodiments, a computer-implemented method is provided for distributed concurrent data updating of a business object having a structured file representation. The method comprises the steps, performed by a client computer system, of: (a) retrieving a stored business object from an object repository accessible by a plurality of client computer systems, said business object divided into a plurality of subsections based on semantics of the business object, each of the plurality of subsections including one or more fields and a sentry having a given value based on content in the one or more fields; (b) modifying content in one or more subsections of the stored business object retrieved in (a) to form a modified business object; (c) determining if the stored business object was changed by another client computer system since it was retrieved in (a); (d) when the stored business object is determined to have been changed in (c), signaling a conflict; and (e) when the stored business object is determined not to have been changed in (c), for each subsection in the modified business object: (e)(i) determining if the subsection was modified in (b); (e)(ii) when the subsection is determined to have been modified in (b), computing a new value for the sentry for that subsection and updating the value for the sentry in the modified business object; and storing the modified business object in the repository.

BRIEF DESCRIPTION OF THE DRAWINGS

FIG. 4 shows an XML file of an exemplary business document in accordance with one or more embodiments.

DETAILED DESCRIPTION

Figure 1:
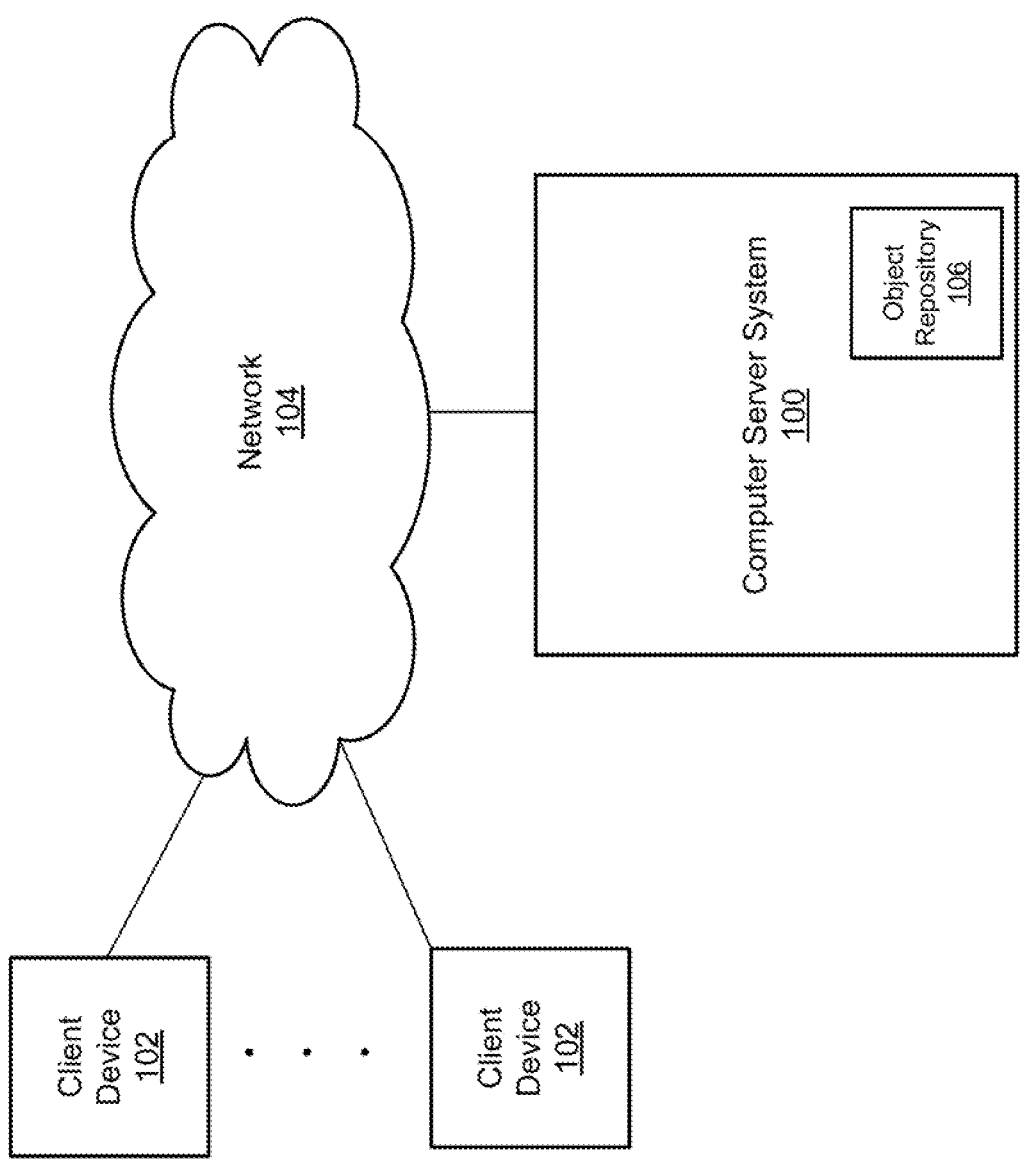
FIG. 1 is a simplified block diagram illustrating a representative network in which a system for managing concurrent data updates can be implemented in accordance with one or more embodiments.

Methods and systems for managing distributed concurrent data updates in accordance with various embodiments are applicable to many different object definition languages, where the object is stored in total in a 'large object' or document. By way of non-limiting example, the large object could be a business object in the form of an XML file.

Non-limiting examples of business objects include purchase orders, work orders, material orders, forecast information, quality information, inventory disposition information, inventory movement information, and product serialization information.

XML is an example of a data format language where the data is self-describing or structured. This means that each data file contains both the business data as well as the its associated meta-data information. The meta-data includes information about the contents, structure, location, and data types of the business data. It is preferred, but not mandatory that the business data can be organized hierarchically. XML is a very common method for defining a self-descriptive data structure. However, any self-descriptive data format can be used to implement the method of distributed concurrent data updates described herein.

The large object is divided into subsections (also referred to herein as objects) based on the semantics of the large object. The subsections are monitored to ensure that updates to a subsection are only allowed if the subsection has not been changed since it was accessed. For instance, if while a first user is attempting to update a subsection, another user has concurrently changed the subsection, a conflict will be detected and the update from the first user will not be allowed.

Underlying the system is an implementation of a distributed checkin/checkout subsystem to replace the large objects in a transactional manner to ensure that subsections will not be partially overwritten.

A data structure (referred to herein as a sentry) is placed inside each subsection that is to be monitored for concurrent update. The sentry keeps information concerning the state of the last update to the subsection. Attempts to update a subsection consult the sentry for that subsection to determine whether to allow the update or signal a conflict.

This enables the system to efficiently process large objects in a distributed fashion, applying updates where they do not collide.

The techniques for distributed concurrent data updating of objects in accordance with various embodiments can have many possible applications. One possible application is for use in a collaborative workspace environment with business objects as described, e.g., in U.S. Patent Application Publication No. 2011/0246340 entitled METHOD AND SYSTEM FOR COLLABORATIVE EXECUTION OF BUSINESS PROCESSES, which is incorporated by reference herein in its entirety. The business object and structured format provides for fully semantic processing and is not reliant on syntactic processing. The detection method provides for finer granularity of conflict detection and subsequently a great chance of applying changes without user intervention. The system provides a fully distributed model without a centralized gatekeeper.

Given a business object in a structured file representation (e.g., XML), a user or program may update the business object. Additionally, a multitude of users or programs may also be attempting to update the business object. The business object is a large object because it represents the totality of the item (e.g., a Purchase Order) in a structured format (e.g., XML).

The large object is divided into subsections according to the semantics of the business object. The sentry in each subsection keeps information concerning the last update of the object. In accordance with one or more embodiments, the technique is to concatenate the individual member values (as strings) and obtain a single hash value from this concatenated string. The hashing function should have properties of low likelihood of collisions as well as high degree of variability if any of the member values change.

The sentry objects do not participate in the hashing operation.

Sentry objects can be placed at each layer of the object hierarchy, for a finer grained concurrency control that is less than the entire large object.

Collections of objects can be handled as long as the entire collection is returned on each check-in.

A check-in comprises merging each subsection protected by a sentry between the last saved subsection and the new updated subsection.

FIG. 1 illustrates an exemplary network, in which a system for managing concurrent data updates can be implemented in accordance with one or more embodiments. A computer server system 100 includes an object repository 106 storing a plurality of large objects that can be checked out, modified, and checked back in by client devices 102. The client devices 102 can either be operated by a user or a program. The client devices communicate with the computer server system 100 over a communications network 104. The communications network 104 may comprise any network or combination of networks including, without limitation, the Internet, a local area network, a wide area network, a wireless network, and a cellular network.

The client devices operated by users to access business objects in the computer server system 100 can comprise any computing device that can communicate with the computer server system including, without limitation, personal computers (including desktop, notebook, and tablet computers), workstations, smart phones and other smart devices, and cell phones.

The computer server system 100 may comprise one or more physical machines, or virtual machines running on one or more physical machines. In addition, the computer server system may comprise a cluster of computers or numerous distributed computers that are connected by the Internet or another network, and may be implemented in a Cloud solution.

Figure 2:
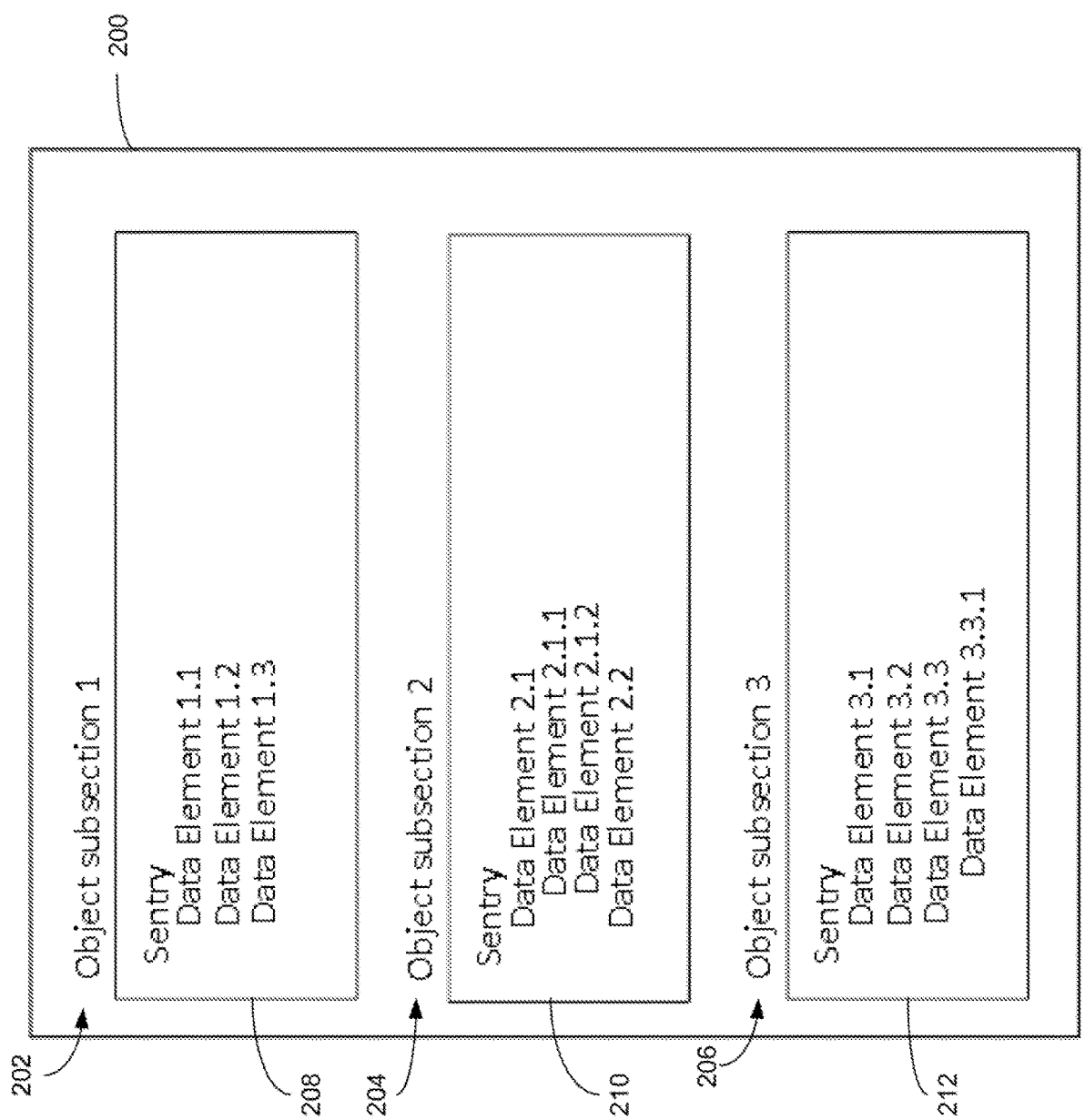
FIG. 2 is a conceptual view of an exemplary business document in accordance with one or more embodiments.
Figure 3:
FIG. 3 is a screenshot of an exemplary business document in accordance with one or more embodiments.

FIGS. 2-4 illustrate an exemplary business object 200 in accordance with one or more embodiments. As shown in the conceptual view of FIG. 2, the business object 200 is divided into a plurality of object subsections 202, 204, 206 based on the semantics of the business object 200. Each subsection 202, 204, 206 includes fields that can be modified by client devices. For instance, as shown in the FIG. 3 user interface, values for various fields are modifiable, including the Review Number, Contact Name, Due Date, Title, and Description fields.

Each object subsection also includes a sentry 208, 210, 212, comprising a plurality of data elements. For example, the sentry 208 shown in FIG. 4 includes data elements specifying date of creation (Created), original author of the subsection the sentry is protecting (Author), date of latest change (Updated), author of the latest change (LastModifier), and the checksum (Cookie).

The checksum value of the sentry is computed by taking the combined contents of the data fields protected by the sentry and applying a hash function. The key attributes of this hash function are that it produces hash values that are very unlikely to be identical given different combined contents as an input and that it produces a different hash value when any input changes. An appropriate hash function should be chosen based on the properties of the combined contents of the input data fields. This is of necessity specific to the domain of the input data. An example of a suitable hash algorithm is the SHA-256 Secure Hash Algorithm developed by the National Security Agency (NSA).

The semantics of the document determine what the sentry protects. In the FIG. 4 example, the first sentry 208 is monitoring fields from ProcessLinkID to Status (inclusive). If any of these fields change, the Updated time, the LastModifier and the Cookie in the sentry 208 will be updated. The second sentry 210 monitors each lot number in the lot numbers list (from LotNumberID to IsDeleted). The third sentry 212 monitors the itemInfo (exclusive of the fields monitored by the second sentry 210 (LotNumberList)) from ProductInfold to isDeleted.

Figure 5:
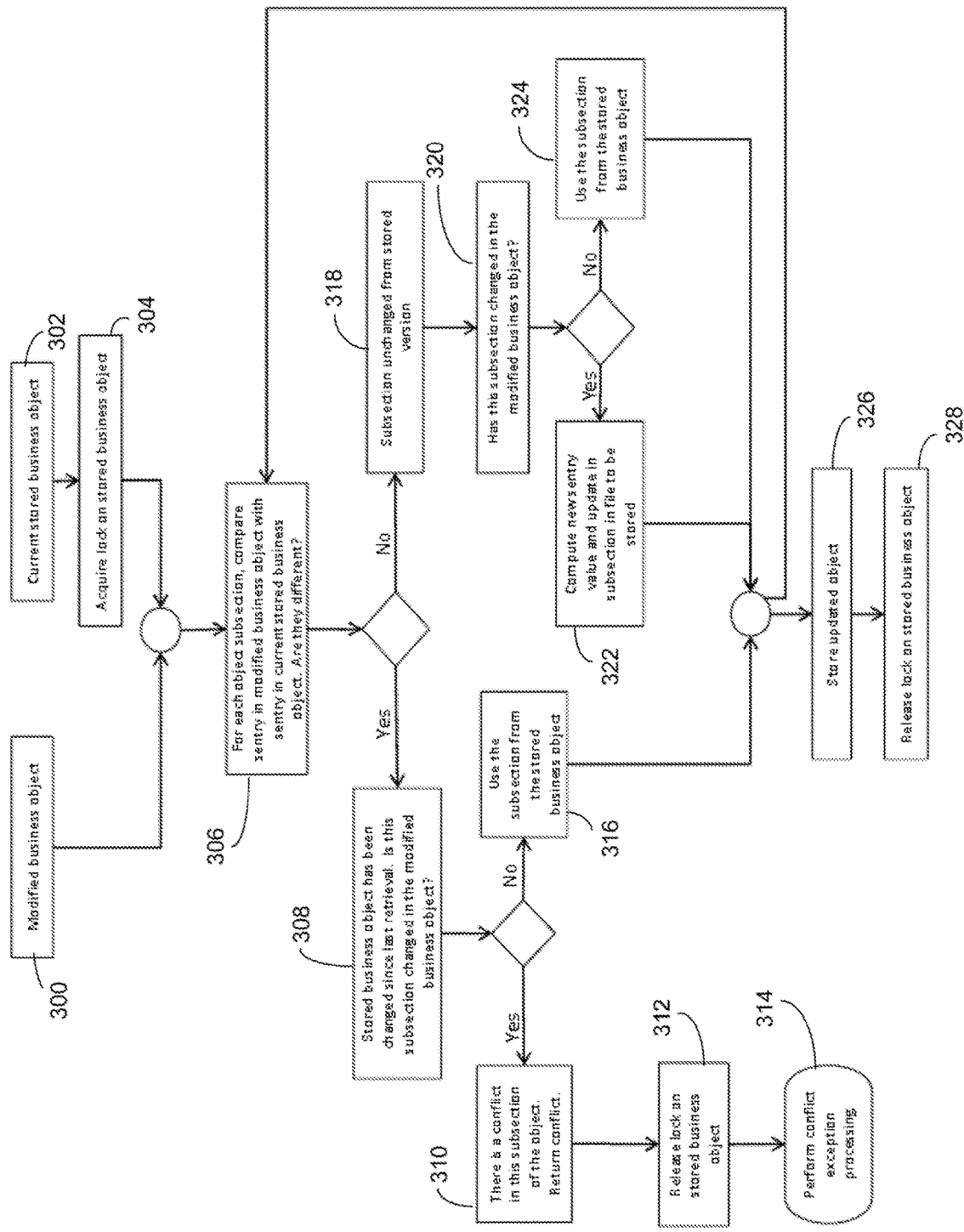
FIG. 5 is a flowchart illustrating an exemplary process for managing concurrent data updates in accordance with one or more embodiments.

FIG. 5 is a flowchart illustrating an exemplary process for managing concurrent data updates in accordance with one or more embodiments. Reference number 300 indicates a business object previously retrieved from the object repository that has been modified by a user or application. Reference number 302 indicates the currently stored business object in the object repository. When the modified business object 302 is ready to be checked in to the object repository, the following occurs. A lock is acquired on the currently stored business object 302 at step 304. This can be accomplished, e.g., by setting a flag in the content repository to indicate that the currently stored business object 302 is in use and cannot be updated by other users or applications.

For each object subsection, the cookie value in the sentry of the modified business object 300 is compared with the cookie value of the sentry in the currently stored business object 302 at step 306. If the cookie values are different, the stored business object 302 has been changed since it was retrieved to form the modified business object 300. At step 308, a decision is made as to whether or not the subsection was changed in the modified business object 300. If the subsection was changed in the modified business object 300, a conflict is signaled at step 310. Then, at step 312, the lock on the stored business object 302 is released, and conflict exception processing is performed at step 314 and the process ends.

The requester is notified that their changes were not saved. In accordance with one or more embodiments, the a list of the sections of the document that have conflicts are provided to the requester. The requester thereby has finer grain control over selectively reapplying the changes after the newest version of the document has been retrieved, or to remove the changes that are in conflict.

If the subsection was not changed in the modified business object 300, then the subsection from the stored business object is selected at step 316 for the updated object.

If, at step 306, the cookie values are determined to be the same then, at 318, the subsection of the stored business object 302 has not been changed since it was retrieved form the modified business object 300. At step 320, a determination is made as to whether the subsection has been changed in the modified business object. If the subsection has been changed, then at step 322, a new sentry value for the subsection is computed and updated in the subsection in the modified business object to be stored. If the subsection has not been changed, then the subsection for the stored business object 300 is used in the business object to be stored at 324.

Once the above process has been repeated for each of these subsections and assuming no conflicts have been signaled, the modified business object is stored in the repository at step 326. At step 328, the lock on the stored business object is released.

Variations on the above process for managing concurrent data objects are possible. For instance, the process described below first checks whether each subsection in the modified business object has been changed, and then checks to see if the subsection in the stored business object in the repository has changed since it was last retrieved. In this embodiment, each subsection has a sentry using the following algorithm to detect concurrent access:

(1) the updated subsection's hash value is computed.

(2) The new hash value is compared to the sentry's hash value on the updated subsection. If this differs, the client (user or program) has changed the value of this subsection in some way.

(3) Having detected a change, the system compares the hash value of the updated sentry with the corresponding sentry in the last saved subsection. If they are different, there is a collision, and the system reports the collision back to the requestor.

(4) If the two sentry hash values agree, there has not been an update between when the client checked the large object out and the check in. This allows the new subsection to replace the corresponding subsection in the saved large object.

(5) The hash value in the sentry is set to the new value computed in step (1).

The processes described above may be implemented in software, hardware, firmware, or any combination thereof. The processes are preferably implemented in one or more computer programs executing on one or more programmable computers including at least one processor, a storage medium readable by the processor (including, e.g., volatile and non-volatile memory and/or storage elements), and input and output devices. Each computer program can be a set of instructions (program code) in a code module resident in the random access memory of the computer. Until required by the computer, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions.

Accordingly, the foregoing description is by way of example only, and not intended to be limiting.

What is claimed is:

1. A computer program product comprising a non-transitory computer-readable storage medium having computer usable program code for distributed concurrent data updating of a business object having a structured format on a computer server system, the computer program product comprising:

computer usable program code which, when executed by a processor, enables retrieving a stored business object from an object repository accessible by a plurality of client computer systems, the stored business object divided into a plurality of subsections based on semantics of the stored business object, each subsection of the plurality of subsections including a sentry having a given value based on content in the subsection, the given value of the sentry for the subsection computed by concatenating the content in the subsection as a string, and obtaining a hash value from the concatenated string;
computer usable program code which, when executed by the processor, enables modifying content in one or more subsections of the retrieved stored business object to form a modified business object;
computer usable program code which, when executed by the processor, enables acquiring a lock on the stored business object in the object repository; and
for each subsection of the modified business object:
comparing the value of the sentry for a subsection of the modified business object to the sentry in the corresponding subsection of the stored business object;
signaling a conflict when the values of the compared sentries are different as indicated by a sub-section-by-sub-section comparison of the sentry values;
determining whether the subsection has been changed in the modified business object when the values of the compared sentries are the same;
computing a new value for the sentry for the subsection, and updating the modified business object to include the new value of the sentry for the subsection when the subsection of the modified business object has been determined to have been changed; and
computer usable program code which, when executed by the processor, enables storing the modified business object in the object repository.

2. The computer program product of claim 1, further comprising signaling a conflict when the values of the compared sentries are different and the subsection has been changed in the modified business object.

3. The computer program product of claim 1, further comprising signaling a conflict when the values of the compared entries are different and the subsection has been changed in the modified business object, and using the corresponding subsection from the stored business object in the modified business object when the subsection has not been changed in the modified business object.

4. The computer program product of claim 1, wherein the business object has a structured file representation.

5. The computer program product of claim 4, wherein the structured file representation comprises XML.

6. The computer program product of claim 1, wherein the given value for each sentry is computed by calculating a checksum using contents of fields in a subsection being protected by the sentry.

7. The computer program product of claim 1, wherein storing the modified business object in the repository comprises merging each subsection of the modified business object into the stored business object in the repository.

8. The computer program product of claim 1, wherein the stored business object is retrieved from an object repository through a collaborative workspace environment.

9. The computer program product of claim 1, wherein each subsection includes one or more fields that can be modified.

10. A computer program product comprising a non-transitory computer-readable storage medium having computer usable program code for distributed concurrent data updating of a business object having a structured format on a computer server system, the computer program product comprising:
computer usable program code which, when executed by a processor, enables retrieving a stored business object from an object repository accessible by a plurality of client computer systems, the stored business object divided into a plurality of subsections based on semantics of the stored business object, each subsection of the plurality of subsections including a sentry having a given value based on content in the subsection, the given value of the sentry for the subsection computed by concatenating the content in the subsection as a string, and obtaining a hash value from the concatenated string;
computer usable program code which, when executed by the processor, enables modifying content in one or more subsections of the retrieved stored business object to form a modified business object;
computer usable program code which, when executed by the processor, enables determining whether the stored business object was changed by performing a sub-section-by-sub-section comparison of sentry values;
computer usable program code which, when executed by the processor, enables signaling a conflict when the stored business object is determined to have been changed by performing the sub-section-by-sub-section comparison of sentry values; and
when the stored business object is determined not to have been changed, for each subsection in the modified business object:
determining whether the subsection was modified;
when the subsection is determined to have been modified, computing a new value for the sentry for that subsection and updating the value for the sentry in the modified business object; and
computer usable program code which, when executed by the processor, enables storing the modified business object in the object repository.

11. The computer program product of claim 10, further comprising computer usable program code which, when executed by the processor, enables:
acquiring a lock on the stored business object in the object repository; and
comparing the value of the sentry for each subsection of the modified business object to the sentry in the corresponding subsection of the stored business object.

12. The computer program product of claim 10, wherein the business object has a structured file representation comprising XML.

13. The computer program product of claim 10, wherein the value for each sentry is computed by calculating a checksum using contents of fields in a subsection being protected by the sentry.

14. The computer usable program code of claim 10 which, when executed by the processor, enables storing the modified business object in the repository by merging each subsection of the modified business object into the stored business object in the repository.

15. The computer usable program of claim 10, wherein the stored business object is retrieved from the object repository through a collaborative workspace environment.

16. The computer usable program code of claim 10, wherein the business object comprises one of a purchase order, a work order, a material order, forecast information, quality information, inventory disposition information, inventory movement information, and product serialization information.

17. A computer server system for distributed concurrent updating of a business object having a structured format, comprising:

a processor; and memory storing computer usable program code that when executed by the processor, causes the processor to:

retrieve a stored business object from an object repository accessible by a plurality of client computer systems, the stored business object divided into a plurality of subsections based on semantics of the stored business object, each subsection of the plurality of subsections including a sentry having a given value based on content in the subsection, the given value of the sentry for the subsection computed by concatenating the content in the subsection as a string, and obtaining a hash value from the concatenated string;

modify content in one or more subsections of the retrieved stored business object to form a modified business object;

determine whether the stored business object was changed by performing a sub-section-by-sub-section comparison of sentry values;

signal a conflict when the stored business object is determined to have been changed by performing the sub-section-by-sub-section comparison of sentry values; and when the stored business object is determined not to have been changed, for each subsection in the modified business object:

determine whether the subsection was modified;

when the subsection is determined to have been modified, compute a new value for the sentry for that subsection and update the value for the sentry in the modified business object; and store the modified business object in the object repository.

18. The computer server system of claim 17, further comprising:

acquiring a lock on the stored business object in the object repository; and comparing the value of the sentry for each subsection of the modified business object to the sentry in the corresponding subsection of the retrieved stored business object.

19. The computer server system of claim 17, wherein the business object has a structured file representation comprising XML.

20. The computer server system of claim 17, wherein the value for each sentry is computed by calculating a checksum using contents of fields in a subsection being protected by the sentry.

21. The computer server system of claim 17, further comprising storing the modified business object in the repository by merging each subsection of the modified business object into the stored business object in the repository.

22. The computer server system of claim 17, wherein the stored business object is retrieved from the object repository through a collaborative workspace environment.

23. The computer server system of claim 17, wherein the business object comprises one of a purchase order, a work order, a material order, forecast information, quality information, inventory disposition information, inventory movement information, and product serialization information.

* * * * *